UNITED STATES PATENT OFFICE 2,096,879

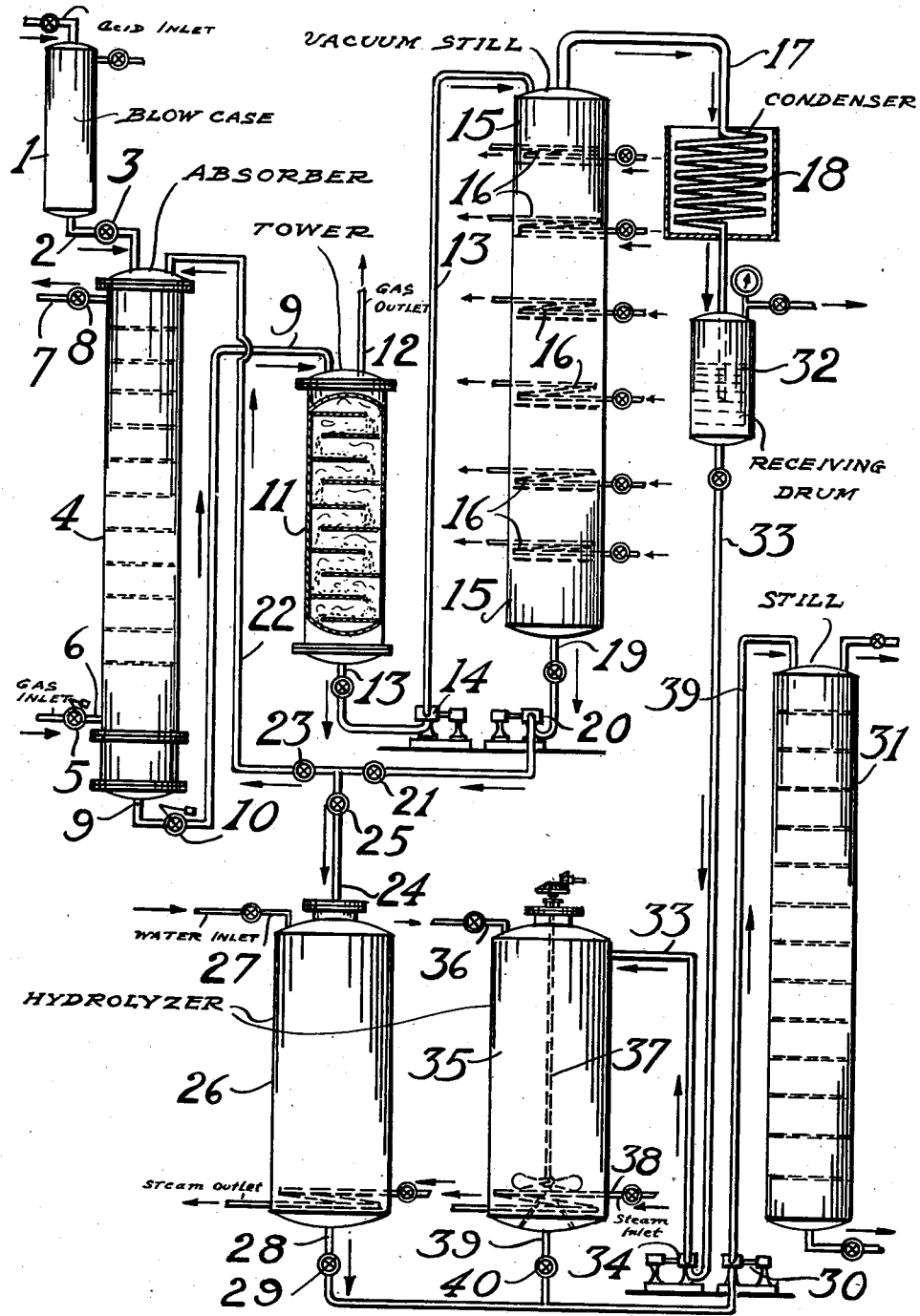

MANUFACTURE OF ALIPHATIC ALCOHOL

Benjamin T. Brooks, Old Greenwich, Conn., assignor to Standard Alcohol Co.

Application October 9, 1934, Serial No. 747,509

12 Claims. (Cl. 260—156)

This invention relates to improvements in the manufacture of alcohols and relates particularly to the manufacture of ethyl alcohol from ethylene.

In the manufacture of ethyl alcohol from ethylene by reacting upon ethylene with sulfuric acid, it is economically very important to produce the largest possible proportion of ethyl alcohol with the use of a given quantity of sulfuric acid.

An object of the present invention is to produce a maximum of ethyl alcohol from a given quantity of sulfuric acid.

In the reaction of ethylene and sulfuric acid the initial product is ethyl hydrogen sulfate or ethyl sulfuric acid. However, diethyl sulfate is also formed, and the acid product contains diethyl sulfate, ethyl sulfuric acid and sulfuric acid when only one mol. of ethylene has been absorbed in one mol. of sulfuric acid. As more ethylene is combined in the acid reaction mixture, the proportion of diethyl sulfate increases. When using ordinary concentrated sulfuric acid, 66° Bé., and absorbing the ethylene under pressures of 250 lbs. or more per square inch at about 70° to 100° C., the reaction rate is satisfactory until about 1.5 mols of ethylene to one mol. of sulfuric acid has been absorbed. Various factors operate against obtaining the theoretical limit of two mols of ethylene to one of sulfuric acid, or pure diethyl sulfate. Thus, when sulfuric acid containing water is employed, such as 85 to 96% H₂SO₄, the yield of diethyl sulfate is lower as the proportion of water present is greater. Also, when nearly anhydrous or 100% sulfuric acid is employed, side reactions and carbonization may occur, decreasing the yields and interfering with the recovery of the sulfuric acid. Also, when diethyl and monoethyl sulfates are hydrolyzed together, with water, a substantial proportion of ethyl ether is formed.

The present invention relates to a process of absorbing ethylene in sulfuric acid under appropriate conditions of temperature, acid concentration and pressure, until a substantial proportion of diethyl sulfate is formed. The acid reaction mixture is then subjected to reduced pressure and heated to effect distillation of diethyl sulfate from the mixture, the diethyl sulfate then being hydrolyzed by water or dilute acid to ethyl alcohol. The residual acid mixture may then be separately hydrolized to ethyl alcohol without forming ether or may be re-saturated with ethylene, again heated under reduced pressure to recover diethyl sulfate, and the process repeated, as desired. It is, of course, necessary to keep the process in operation, to add fresh sulfuric acid to the residual acid mixture to replace the acid removed as the ester, diethyl sulfate. The net result of this operation is to produce ethyl alcohol with the minimum of sulfuric acid, the direct absorption of 2 mols of ethylene to one of surfuric acid being practically not feasible.

The process of the present invention possesses a further advantage in that more diethyl sulfate can be recovered in this way than can be obtained by diluting the acid product, diluting with water and mechanically removing the diethyl sulfate. This will be understood from the fact that when the undiluted acid reaction product is heated and distilled under vacuum, the diethyl sulfate present distills from the mixture, and as this is removed from the mixture, more is formed from the ethyl hydrogen sulfate, according to the equilibrium:

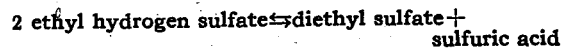

2 ethyl hydrogen sulfate⇌diethyl sulfate + sulfuric acid

It is, of course, not economically possible to convert all of the ethyl hydrogen sulfate to diethyl sulfate in this manner, but the partial regeneration of sulfuric acid in this way makes the residual acid mixture more suitable for reaction with additional ethylene.

The process of the present invention has a further advantage in that by hydrolysis of the distilled diethyl sulfate and distillation of the alcohol, a clean dilute acid is produced, free from carbon, and which can be re-concentrated without loss due to the presence of carbon.

The residual acid is preferably supplemented with 96 to 100% sulfuric acid, in order that the proportion of water in the acid reaction mixture will not progressively increase. This residual acid, with additions of fresh acid may be used over and over again. In practice, using initially 95 to 96% sulfuric acid at 80° to 90° C. and ethylene under about 300 lbs. pressure, a small amount of blackening or carbonization occurs. It is accordingly preferable to minimize the carbonization by operating at somewhat lower temperatures than are otherwise to be preferred, and accordingly in the practice of the present invention it is preferred to carry out the reaction with ethylene under pressure at 70 to 80° C.

When the carbonaceous material has accumulated in the residual recycled acid reaction mixture to an extent that may cause operating difficulties, the mixture may be diluted with water, the sulfuric esters hydrolyzed in the usual manner and the alcohol distilled. A large proportion of the carbonaceous matter in the diluted acid separates out in a form which can be mechanically removed, as by filtering through a sand filter, before re-concentrating the acid. The concentration of carbonaceous matter in this way, and mechanical removal of large proportions of it before re-concentrating the acid, constitutes a further advantage of the present invention.

It was found further that due to decrease in the absorption or reaction rate of the ethylene it is not advantageous to continue passing ethylene into the acid after about 1.5 mols of ethylene are absorbed per one mol. of sulfuric acid, when using initially acid of not over 96% $H_2SO_4$ and a temperature of about 80°. With acid of 98 to 100% $H_2SO_4$ the absorption of ethylene can be carried somewhat further, up to about 1.75 to 1.80 mols of ethylene to one of sulfuric acid, to form larger proportions of diethyl sulfate.

When the reaction with the ethylene, or gas containing ethylene, has progressed until the absorption of the ethylene is markedly retarded, the acid reaction mixture is removed from the absorption apparatus and preferably, without cooling or storage, is transferred to a vacuum still in which it is subjected to further heating under reduced pressure and the diethyl sulfate is distilled from the mixture. The ethyl hydrogen sulfate has a solvent action for the diethyl sulfate and it is necessary to employ somewhat higher temperatures or lower pressures, or both, than when distilling pure diethyl sulfate. The diethyl sulfate and ethyl sulfuric acid are miscible in all proportions. Although the decomposition of diethyl sulfate is not very rapid below 150°, it is preferred to maintain the temperature of the still, or contents of the still, at not over 130° C., and to maintain an absolute pressure of 20 mm. of mercury, or lower, on the vapors. Under these conditions most of the diethyl sulfate distills and is condensed in a suitable condenser and collected in an appropriate receiver. The still employed for this purpose may be a lead lined still or a still made of acid resistant material such as acid resistant alloys, provided with a jacket, or internal heating coils, for supplying heat by steam, hot oil and the like, and operating on the batch principle. However, to minimize decomposition during the distillation process, it is preferred to pass the acid reaction mixture containing diethyl sulfate through a still of the column or film evaporator type, in which small quantities of the acid reaction mixture are heated for only a relatively brief interval of time, under reduced pressure. This also permits heating the material to a higher temperature with less decomposition than in the case of the more prolonged batch method of distillation.

The method of carrying out the process of the present invention is shown diagrammatically in the accompanying drawing. Sulfuric acid, which may be preheated if desired, is introduced into the blow case 1 from which it flows by the line 2 and the control valve 3 to the absorber 4. The absorber 4 is constructed of acid-resistant material and the temperature of the acid reaction mixture is maintained at the desired operating temperature by heating or cooling coils, not shown. Ethylene or gas containing ethylene is introduced, preferably under pressure, through the line 5 provided with valve 6 and released through the line 7, and a suitable control valve 8. The acid reaction mixture containing mainly diethyl sulfate and ethyl hydrogen sulfate is removed from the absorber 4 by the line 9 and a release valve 10 and introduced into the tower or chamber 11 where the gases, dissolved in the acid liquid, are released and led out through the pipe 12. The acid reaction mixture is then withdrawn through the pipe 13 and pumped by the pump 14 to the vacuum still 15. The vacuum still is heated by the heating coils 16 or by a steam jacket or other suitable means. Instead of the tower type of still, a pipe still or film evaporator type of apparatus or other type of still suitable for distillation under reduced pressure and constructed of acid-resistant material, may be employed. The vapors containing diethyl sulfate are removed through the pipe 17 and passed to the condenser 18. The residual acid reaction mixture, after partially or completely removing the diethyl sulfate, is removed from the still 15 by the line 19 and the pump 20, and may then be passed through the valve 21 and the pipe 22 and valve 23 back to the ethylene absorber 4; or the residual acid mixture from the still 15 may be passed through the pipe 24 and the valve 25 to the hydrolyzer 26. Although there are advantages in separately hydrolyzing the residual acid reaction mixture, which has been freed from diethyl sulfate, the maximum acid economy is realized by returning the residual acid reaction mixture from the still 15 to the absorber 4.

The residual acid reaction mixture, substantially free from diethyl sulfate, is mixed with water, introduced through the pipe 27 and hydrolyzed in the vessel 26, converting most of the ethyl sulfuric acid to alcohol and free sulfuric acid. The hydrolysis and distillation can be carried out simultaneously, sufficient time being allowed for substantially complete hydrolysis, but the procedure shown in the accompanying diagrammatic drawing, in which hydrolysis of the ethyl sulfuric acid is separately carried out, is satisfactory. Dilution with water equivalent to 35 parts of sulfuric acid upon final hydrolysis, to 65 parts by water, and a hydrolyzing temperature of 60° to 80° C. is preferable. The hydrolyzed acid product may be removed from the hydrolyzer 26 by the pipe 28 and the valve 29, and pumped by a suitable pump 30 to a still 31.

The diethyl sulfate condensed in the condenser 18 is passed into the receiver 32 which is connected by the pipe 33 to a suitable vacuum pump, not shown. The still 15, condenser 18 and receiver 32 are in free communication, the reduced pressure being maintained on all three vessels. The diethyl sulfate is withdrawn from the receiver 32 through the pipe 33 and the pump 34 to the hydrolyzer 35. Water or dilute acid is introduced into the hydrolyzer 35 by means of the inlet pipe 36. The contents of the hydrolyzer 35 are preferably agitated mechanically, as by the stirrer 37, hydrolysis being promoted by intimate mixing and agitation of the diethyl sulfate and water. The hydrolyzer 35 may be heated by a heating coil connected at 38 with a source of steam or other heating medium.

When the hydrolysis of the diethyl sulfate has been practically completed, the hydrolyzed material may be withdrawn through the pipe 39 and the valve 40 and passed by the pump 30 to the still 31 where the alcohol is removed by distillation and condensed in a suitable condenser, not shown.

This process may also be used in the manufacture of isopropyl alcohol in that the separation of di-isopropyl sulfate may also be made by distillation at reduced pressure whereby the formation of ether is reduced and larger yields of alcohols are obtained.

The foregoing description is merely illustrative and various changes and alternative arrangements may be made within the scope of the appended claims in which it is my intention to claim all inherent novelty in the invention as broadly as the prior art permits.

I claim:

1. In the manufacture of alcohols from olefines, the process which comprises absorbing at a pressure of at least 250 pounds per square inch an olefine of the group consisting of ethylene and propylene in sulfuric acid maintained at a temperature of about 70° to about 100° C. in order to obtain a dialkyl sulfate, subjecting the sulfuric acid containing the dialkyl sulfate to distillation under reduced pressure to separate the dialkyl sulfate and hydrolyzing the separated dialkyl sulfate to obtain an alcohol.

2. In the manufacture of ethyl alcohol from ethylene, the process which comprises absorbing at a pressure of at least 250 pounds per square inch ethylene in sulfuric acid maintained at a temperature of about 70° to about 100° C. to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate to form ethyl alcohol.

3. In the manufacture of ethyl alcohol from ethylene, the process which comprises absorbing at a pressure of at least 250 pounds per square inch the ethylene in sulfuric acid maintained at a temperature of about 70° to about 100° C. to form a substantial proportion of diethyl sulfate, subjecting the sulfuric acid containing the diethyl sulfate to distillation under a pressure lower than atmospheric pressure to separate the diethyl sulfate, absorbing ethylene in the residual sulfuric acid to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate to form ethyl alcohol.

4. In the manufacture of ethyl alcohol from ethylene according to claim 2, sulfuric acid is added to replace the sulfuric acid removed as diethyl sulfate.

5. In the manufacture of ethyl alcohol from ethylene, the process which comprises absorbing at a pressure of at least 250 pounds per square inch ethylene in sulfuric acid maintained at a temperature of about 70° to about 100° C. to form a substantial proportion of diethyl sulfate, subjecting the sulfuric acid containing the diethyl sulfate to distillation under a pressure lower than atmospheric pressure to separate the diethyl sulfate and separately hydrolyzing the separated diethyl sulfate and the residual sulfuric acid to form ethyl alcohol.

6. In the manufacture of ethyl alcohol from ethylene, the process which comprises absorbing at a pressure of at least 250 pounds per square inch ethylene in sulfuric acid of 95 to 96% strength maintained at a temperature of about 70° to about 100° C. to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate and the residual sulfuric acid to form ethyl alcohol.

7. In the manufacture of ethyl alcohol from ethylene, the process which comprises absorbing at a pressure of at least 250 pounds per square inch ethylene in sulfuric acid maintained at a temperature of about 70° to about 100° C. to form a substantial proportion of diethyl sulfate, subjecting the sulfuric acid containing the diethyl sulfate to distillation under an absolute pressure not over 30 mm. of mercury to separate diethyl sulfate and hydrolyzing the separated diethyl sulfate to form ethyl alcohol.

8. In the manufacture of ethyl alcohol from ethylene, the process which comprises absorbing at a pressure of at least 250 pounds per square inch ethylene in sulfuric acid at a temperature of about 70° to 80° C. to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate to form ethyl alcohol.

9. In the manufacture of ethyl alcohol from ethylene, the process which comprises absorbing at a pressure of at least 250 pounds per square inch about 1½ mols of ethylene in sulfuric acid of 95 to 96% strength maintained at a temperature of about 70° to about 100° C. to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate to form ethyl alcohol.

10. In the manufacture of ethyl alcohol from ethylene, the process which comprises absorbing at a pressure of at least 250 pounds per square inch about 1½ mols of ethylene in sulfuric acid of 90 to 100% strength maintained at a temperature of about 70° to about 100° C. to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate to form ethyl alcohol.

11. In the manufacture of ethyl alcohol from ethylene, the process which comprises absorbing at a pressure of at least 250 pounds per square inch 1.75 to 1.8 mols of ethylene in sulfuric acid of 98 to 100% strength to form a substantial proportion of diethyl sulfate, subjecting the sulfuric acid containing the diethyl sulfate to distillation under a pressure lower than atmospheric pressure to separate the diethyl sulfate and hydrolyzing the separated diethyl sulfate to form ethyl alcohol.

12. In the manufacture of ethyl alcohol from ethylene, the process according to claim 11, in which the distillation of the diethyl sulfate from a mixture containing sulfuric acid and diethyl sulfate is carried out at a temperature of about 130° C. and an absolute pressure not over 30 mm. of mercury.

BENJAMIN T. BROOKS.